United States Patent [19]

Sekhar et al.

[11] Patent Number: 5,279,737
[45] Date of Patent: Jan. 18, 1994

[54] PROCESS FOR PRODUCING A POROUS CERAMIC AND POROUS CERAMIC COMPOSITE STRUCTURE UTILIZING COMBUSTION SYNTHESIS

[75] Inventors: Jainagesh A. Sekhar; Sarit B. Bhaduri, both of Cininnati, Ohio

[73] Assignee: University of Cincinnati, Cincinnati, Ohio

[21] Appl. No.: 71,948

[22] Filed: Jun. 3, 1993

Related U.S. Application Data

[63] Continuation of Ser. No. 537,902, 6/13/90 Abn.
[51] Int. Cl.$^5$ .............................................. B01D 71/04
[52] U.S. Cl. .................................. 210/490; 210/496; 210/510.1; 427/245
[58] Field of Search ............... 210/496, 500.25, 500.26, 210/510.1, 490; 427/245, 246; 420/590

[56] References Cited

U.S. PATENT DOCUMENTS

| | | | |
|---|---|---|---|
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,345,440 | 10/1967 | Googin et al. | 264/29 |
| 3,705,791 | 12/1972 | Bredzs | 29/195 |
| 3,726,643 | 4/1973 | Merzhanov et al. | 423/409 |
| 3,778,249 | 12/1973 | Benjamin et al. | 25/0.5 BC |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,024,056 | 5/1977 | Yarwood et al. | 210/69 |
| 4,081,371 | 3/1978 | Yarwood et al. | 210/69 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,391,918 | 7/1983 | Brockmeyer | 501/127 |
| 4,459,363 | 7/1984 | Holt | 501/96 |
| 4,699,763 | 10/1987 | Sinharoy et al. | 419/11 |
| 4,710,348 | 12/1987 | Brupbacher et al. | 420/129 |
| 4,751,048 | 6/1988 | Christodoulou et al. | |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/590 X |
| 4,808,372 | 2/1989 | Koczak et al. | 420/457 |
| 4,836,982 | 6/1989 | Brupbacher et al. | 420/129 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,965,044 | 10/1990 | Miyamoto et al. | 419/12 |
| 4,975,191 | 12/1990 | Brockmeyer et al. | 210/510 |
| 4,985,202 | 1/1991 | Moshier et al. | 420/590 |
| 4,988,480 | 1/1991 | Merzhanov et al. | 419/11 |
| 4,990,295 | 2/1991 | Hida | 264/65 |
| 5,006,290 | 4/1991 | Hida | 264/65 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,071,797 | 12/1991 | Hida | 501/87 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |

FOREIGN PATENT DOCUMENTS 0404943 12/1988 European Pat. Off. .

OTHER PUBLICATIONS

J. W. McCauley et al. "Simultaneous Preparation . . .", Ceramic Engineering, 3 (1982), pp. 538-554.
R. W. Rice et al., "Effects of Self-Propagating . . ." Cermic Engineering, 7 (1986), pp. 737-749.
H. C. Yi, Journal Materials Science, 25 (1990) pp. 1159-1168.
C. H. Samans "Powder Metallurgy", American Society For Metals, Metals Handbook, 1948, pp. 47-52.

*Primary Examiner*—Frank Spear
*Attorney, Agent, or Firm*—Frost & Jacobs

[57] ABSTRACT

A process for producing a porous ceramic, ceramic composite or metal-ceramic composite structure by combustion synthesis wherein a foamed polymer shape is impregnated with a slurry of ceramic precursors and ignited to initiate combustion synthesis, thereby obtaining a ceramic, ceramic composite or metal-ceramic composite article having interconnected porosity. Ceramic composite filters having improved strength, toughness and thermal shock resistance are provided, with the ceramic composite being an oxide and a nonoxide.

19 Claims, No Drawings

PROCESS FOR PRODUCING A POROUS CERAMIC AND POROUS CERAMIC COMPOSITE STRUCTURE UTILIZING COMBUSTION SYNTHESIS

This is a continuation of application Ser. No. 07/537,902, filed Jun. 13, 1990, now abandoned.

BACKGROUND OF THE INVENTION

1. Field of the Invention

This invention relates to a process for producing a porous ceramic and porous ceramic composite structure having interconnected porosity, in particular a ceramic filter, which utilizes combustion synthesis, also known as self-propagating high temperature synthesis, thereby obviating a high temperature firing step required in the conventional process.

Ceramic filters are used for filtering undesirable particles from a molten metal before the metal is poured into a pattern or mold. Porous ceramic articles are also in use, e.g., as substrates for catalysts, removal of contaminants from exhaust gases, collecting impurities from highly corrosive acids and chemicals, in kiln furniture, or aerospace applications. Ceramic filters are also used as structural materials in low density load bearing structures.

2. Description of the Prior Art

U.S. Pat. No. 3,090,094, issued May 21, 1963 to K. Schwartzwalder et al, discloses a method of making an open-cell porous ceramic article which comprises immersing an open-cell spongy material, preferably polyurethane, in a slurry containing a ceramic coating material to coat cell-defining walls of the spongy material, removing excess slurry from the spongy material, and firing the coated spongy material at a temperature and for a time sufficient to remove the spongy material and form a hardened, vitrified structure. The ceramic coating material may include particulate zirconia, zircon, petalite, mullite, talc, silica and alumina, having particle sizes ranging from −80 mesh to −600 mesh. A binder such as clay, sodium silicate, and calcium aluminate and phosphoric acid, is preferably present in the slurry. Firing is conducted at 500° to 3000° F. (260° to 1650° C.), preferably at 2100° to 2950° F. (1150° to 1620° C.).

U.S. Pat. No. 3,097,930, issued Jul. 16, 1963 to I. J. Holland, discloses a method of making a porous shape of sintered refractory material which comprises impregnating a foamed plastic sponge shape with a suspension of refractory particles, drying the impregnated shape, and firing the dried shape in an inert atmosphere to volatilize the sponge material and to sinter the refractory particles. The impregnation and drying steps may be repeated. The foamed plastic sponge may be polystyrene, polyethylene, polyvinyl chloride, latex, or polyurethane, the latter being preferred. Refractory materials include clays, minerals, oxides, borides, carbides, silicides, nitrides and mixtures thereof. Specific examples used alumina, beryllia and china clay with particle sizes ranging from less than 1 to greater than 10 microns. Firing was conducted at 1700° C. for alumina and 1350° C. for china clay.

U.S. Pat. No. 4,697,632, issued Oct. 6, 1987 to N. G. Lirones, discloses a ceramic foam filter, insulating refractory lining, and a melting crucible, and a process for production thereof, which comprises providing an open-cell foam pattern, impregnating the pattern with a ceramic slurry, burning out the foam pattern at a temperature between 1400° and 2200° F. (760° and 1205° C.) to form a ceramic substrate, impregnating the ceramic substrate with additional ceramic slurry, and firing the impregnated ceramic substrate at a temperature of 2200° to 3400° F. (1205° to 1870° C.). The foam pattern material may be a flexible polyurethane, polyethylene, polypropylene or graphite. A suitable ceramic slurry contains from 1% to 20% silica (dry weight), and from 99% to 80% alumina (dry weight), with a viscosity between 5 and 20 seconds and a film weight between 1.0 and 8.0 grams per standard six inch square plate. Preferably the slurry includes a suspending agent, a wetting agent and a defoaming agent. Zirconia may also be used as ceramic material.

U.S. Pat. No. 3,111,396, issued Nov. 19, 1963 to B. B. Ball, discloses a method of making a porous metallic article which comprises impregnating a porous organic structure with a suspension of powdered metal, metal alloy or metal compound, and binder, slowly drying the impregnated structure, heating at about 300°–500° F. (150°–260° C.) to char the organic structure, and then heating at about 1900° to about 3000° F. (1040° to 1650° C.) to sinter the powder into a porous material.

Other United States patents relating to porous ceramic filters and methods for making them include:

| | |
|---|---|
| 3,893,917 - July 8, 1975 | - M. J. Pryor et al |
| 3,947,363 - March 30, 1976 | - M. J. Pryor et al |
| 3,962,081 - June 8, 1976 | - J. C. Yarwood et al |
| 4,024,056 - May 17, 1977 | - J. C. Yarwood et al |
| 4,081,371 - March 28, 1978 | - J. C. Yarwood et al |
| 4,257,810 - March 24, 1981 | - T. Narumiya |
| 4,258,099 - March 24, 1981 | - T. Narumiya |
| 4,391,918 - July 5, 1983 | - J. W. Brockmeyer |

All these patents require firing the dried filter at high temperature in order to sinter the ceramic material.

"Simultaneous Preparation and Self-Sintering of Materials in the System Ti-B-C", J. W. McCauley et al, Ceramic Eng. & Sci. Proceedings, 3, 538–554 (1982), describes self-propagating high temperature synthesis (SHS) techniques using pressed powder mixtures of titanium and boron; titanium, boron and titanium boride ($TiB_2$); and titanium and $B_4C$. Stoichiometric mixtures of titanium and boron were reported to react almost explosively (when initiated by a sparking apparatus) to produce porous, exfoliated structures. Reaction temperatures were higher than 2200° C. Mixtures of titanium, boron and titanium boride reacted in a much more controlled manner, with the products also being very porous. Reactions of titanium with $B_4C$ produced material with much less porosity. Particle size distribution of the titanium powder was found to have an important effect on the process, as was the composition of the mixtures. Titanium particle sizes ranging from about 1 to about 200 microns were used.

"Effects of Self-Propagating Synthesis Reactant Compact Character on Ignition, Propagation and Resultant Microstructure", R. W. Rice et al, Ceramic Eng. & Sci. Proceedings, 7, 737–749 (1986), describes SHS studies of reactions using titanium powders to produce TiC, $TiB_2$, or $TiC+TiB_2$. Reactant powder compact density was found to be a major factor in the rate of reaction propagation, with the maximum rate being at about 60±10% theoretical density. Reactant particle size and shape were also reported to affect results, with titanium particles of 200 microns, titanium flakes, foil or wire either failing to ignite or exhibiting slower propagation rates. Particle size distribution of powdered materials (Al, B, C, Ti) ranged from 1 to 220 microns. Tests were attempted with composites of continuous graphite tows infiltrated with a titanium slurry, but delamination occurred. Tests with one or a few tows infiltrated with a titanium powder slurry (to form TiC plus excess Ti) were able to indicate a decrease in ignition propagation rates as the thermal conductivity of the environment around the reactants increases, leading to a failure to ignite when local heat losses are too high.

H. C. Yi et al, in *Jour. Materials Science*, 25, 1159-1168 (1990), review SHS of powder compacts and conclude that almost all the known ceramic materials can be produced by the SHS method for applications such as abrasives, cutting tools, polishing powders; elements for resistance heating furnaces; high temperature lubricants; neutron alternators; shape-memory alloys; steel melting additives; and electrodes for electrolysis of corrosive media. The need for considerable further research is acknowledged, and major disadvantages are pointed out.

This article further reports numerous materials produced by SHS and combustion temperatures for some of them, viz., borides, carbides, carbonitrides, nitrides, silicides, hydrides, intermetallics, chalcogenides, cemented carbides, and composites.

Combustion wave propagation rate and combustion temperature are stated to be dependent on stoichiometry of the reactants, pre-heating temperature, particle size and amount of diluent.

U.S. Pat. No. 4,459,363, issued Jul. 10, 1984 to J. B. Holt, discloses synthesis of refractory metal nitride particles by combustion synthesis of an alkali metal or alkaline earth metal azide with magnesium or calcium and an oxide of Group III-A, IV-A, III-B, or IV-B metals (e.g., Ti, Zr, Hf, B and Si), preferably in a nitrogen atmosphere.

U.S. Pat. No. 4,909,842, issued Mar. 20, 1990 to S. D. Dunmead et al, discloses the production of dense, finely grained composite materials comprising ceramic and metallic phases by self-propagating high temperature synthesis (SHS) combined with mechanical pressure applied during or immediately after the SHS reaction. The ceramic phase or phases may be carbides or borides of titanium, zirconium, hafnium, tantalum or niobium, silicon carbide, or boron carbide. Intermetallic phases may be aluminides of nickel, titanium or copper, titanium nickelides, titanium ferrides, or cobalt titanides. Metallic phases may include aluminum, copper, nickel, iron or cobalt. The final product has a density of at least about 95% of the theoretical density and comprises generally spherical ceramic grains not greater than about 5 microns in diameter in an intermetallic and/or metallic matrix. Interconnected porosity is not obtained in this product, nor does the process control porosity.

The well known thermit reaction involves igniting a mixture of powdered aluminum and ferric oxide in approximately stoichiometric proportions which reacts exothermically to produce molten iron and aluminum oxide.

The conventional process for producing porous ceramic filters and structural parts requires long soaking periods at very high temperatures. There are two serious disadvantages in this process: first, the energy consumption is high; secondly, soaking the ceramic foam (particularly larger structures) at very high temperature results in sagging and warping of the structure, thus losing dimensional tolerance. Moreover, the ceramic composition resulting from a conventional mixture of silica and alumina may not be capable of withstanding very high thermal shock, unless a cordierite phase (composed of silica, alumina and magnesia) is present.

There is therefore a definite need for an improved process for the production of porous ceramic structures, despite the numerous patents acknowledged above.

To the best of applicants' knowledge, there has been no suggestion in the prior art of the possibility of utilizing combustion synthesis techniques in the fabrication of porous ceramic structures involving the impregnation of a foamed polymer with ceramic precursors to obtain interconnected porosity.

SUMMARY OF THE INVENTION

It is an object of the present invention to provide a process for producing a porous ceramic structure which avoids the disadvantages of the conventional process pointed out above.

It is a further object of the invention to provide a process for producing a porous ceramic structure or article wherein the ceramic material is at least one of an oxide, carbide, nitride, boride, and silicide.

It is another object of the invention to provide a process for producing a porous metal-ceramic composite structure or article.

It is still another object to provide a porous ceramic or porous metal-ceramic composite structure or article made by the process of the invention.

It is a further object of the invention to provide an oxide-nonoxide porous ceramic composite filter having improved strength and thermal shock resistance.

According to the invention there is provided a process for producing a porous ceramic or ceramic composite structure, which comprises providing a slurry of particulate ceramic precursors capable of undergoing combustion synthesis, impregnating a foamed polymer shape with said slurry, heating the slurry-impregnated polymer shape to a temperature sufficient to remove said polymer, and igniting said ceramic precursors to initiate combustion synthesis, thereby obtaining a ceramic or ceramic composite structure having interconnected porosity.

According to the invention there is further provided a process for producing a porous metal-ceramic composite structure, which comprises providing a slurry of particulate ceramic and metal precursors capable of undergoing combustion synthesis, impregnating a foamed polymer shape with said slurry, heating the slurry-impregnated polymer shape to a temperature sufficient to remove said polymer, and igniting said ceramic and metal precursors to initiate combustion synthesis, thereby obtaining a metal-ceramic composite structure having interconnected porosity.

In the broadest aspect ceramic precursors suitable in the practice of the invention include any materials capable of undergoing a combustion synthesis reaction. Such a reaction is defined as one wherein the heat of reaction heats up the reactants in front of the products and causes further reaction. Porous ceramic structures, ceramic composite structures and metal-ceramic composite structures which may be produced include, but are not limited to:

borides of titanium, zirconium, niobium, tantalum, molybdenum, hafnium, chromium, and vanadium;

carbides of titanium, hafnium, boron, aluminum, tantalum, silicon, tungsten, zirconium, niobium, and chromium;

carbonitrides of titanium, niobium, and tantalum;

nitrides of titanium, zirconium, boron, aluminum, silicon, tantalum, hafnium, and niobium;

silicides of molybdenum, titanium, zirconium, niobium, tantalum, tungsten, and vanadium;

hydrides of titanium, zirconium, and niobium;

composites and metal-ceramic composites of iron-aluminum oxide; aluminum oxide-titanium boride; aluminum-aluminum oxide-titanium boride; titanium-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide; and vanadium nitride-aluminum oxide.

The ceramic precursors may comprise a mixture of particulate iron oxide ($Fe_2O_3$) and aluminum in approximately stoichiometric proportions, having average particle sizes ranging from about 1 to about 150 microns, for production of a metal-ceramic composite.

The ceramic precursors may comprise a mixture of from about 65% to about 95% by weight titanium and about 5% to about 35% by weight boron, having average particle sizes ranging from about 1 to about 150 microns.

When the porous ceramic structure is a filter for molten metal, the ceramic precursors may comprise at least about 75% by weight of a mixture of particulate titanium and boron within the above proportions, and remainder additives for grain refining of the metal.

Other exemplary embodiments include as ceramic precursors:

a mixture of metallic aluminum, titania ($TiO_2$) and boric oxide ($B_2O_3$) to produce an aluminum oxide-titanium boride ceramic composite; a mixture of silicon and graphite to produce a silicon carbide ceramic; a mixture of metallic aluminum, titania, boric oxide, and zirconium oxide; a mixture of metallic aluminum, titania, boric oxide, and niobium

DETAILED DESCRIPTION OF THE INVENTION

The proportions of ceramic precursors are critical to the extent that the amounts of each reactant must be sufficient to cause the combustion reaction front to move forward on its own. However, strict stoichiometric proportions need not be observed in most instances since an excess of, e.g., a metallic component may be used which will be present in the final product as a desired, uncombined metal phase.

In order to obtain an interconnected porous structure instead of a powder or some other unsatisfactory product, it is necessary that the heat generated in the reaction be sufficient to fuse the reaction products, but that the rate of heat generation does not cause an explosion.

In the preferred practice of the process of the invention an aqueous slurry is prepared containing the ceramic precursors. The slurry may contain conventional amounts of suspension agents, surfactants and antifoaming agents, e.g., in total up to about 5% by volume, in order to facilitate application, wetting and impregnation of the foamed polymer with the ceramic precursors.

A binder such as colloidal silica, polyvinyl alcohol, polyorganosilazanes, or methyl silazanes, is also preferred for improved "green" strength Colloidal silica and polyvinyl alcohol are not involved in the combustion synthesis reaction. In the case of silazanes, silicon carbide may be formed as one of the reaction products.

The concentration of ceramic precursors in the aqueous slurry is not critical and may be any amount which will obtain a viscosity such that wetting of the foamed polymer is ensured without excessive run-off.

The type of foamed polymer is not critical, although it is preferred to select a thermoplastic or thermosetting polymer which will volatilize or decompose at a temperature not exceeding about 1100° C. In general, conventional foamed polymers which will volatilize, decompose or char when heated to a temperature of about 400° to about 1100° C. are suitable, such as polyurethane, polyvinyl chloride, polyethylene and polypropylene. Cellulose sponge and natural or polymeric fibers in woven or non-woven form may also be used and are intended to be included within the generic term foamed polymer.

Application of the slurry to the foamed polymer can conveniently be effected in the conventional manner by dipping the polymer into the slurry, squeezing out the excess and drying the slurry, the dipping and drying being repeated several times.

After the repeated dipping and drying steps the slurry-impregnated polymer is heated to a temperature of about 400° to about 1100° C. in order to drive off the polymer.

The slurry-impregnated polymer may next again be dipped into the slurry after the heating step and dried. The dipping and drying may be done several times.

Finally, the porous structure is ignited by means of an electric arc, electric spark, flame, welding electrode, laser or other conventional manner to initiate combustion synthesis. The final product is a porous ceramic structure which may be used as a filter of any desired shape and size for molten metal, gas or liquid filtration, as a substrate for catalysts or other reactant materials, for electronic components, refractory brick, kiln "furniture", or for aerospace applications.

It is a distinct advantage of the present invention that the strength and thermal shock resistance of the porous structure can be controlled by selection of the thickness of the interconnecting ceramic portions of the matrix and composition of the ceramic precursors, and by use of composites, particularly metal-ceramic composites.

When the ceramic precursors are a mixture of iron oxide and metallic aluminum, it will be recognized that metallic iron will constitute a part of the final ceramic structure, with the remainder being aluminum oxide. Such a material would find utility for structural applications since the metallic iron present therein would provide relatively high strength. On the other hand, since the melting point of iron is about 1535° C., its use in extremely high temperature applications would be precluded.

When the precursors are titanium and boron, stoichiometric proportions need not be observed since a mixture ranging from about 65% to about 95% by weight titanium and remainder boron will undergo combustion synthesis. The resulting titanium boride porous ceramic product has an extremely high melting point of about 2900° C. (except for free titanium which may be present) and hence can be used in very high temperature operations which would be beyond the capabilities of conventional ceramic structures derived from silica and alumina.

The ceramic precursors may comprise powder mixtures containing from about 35% to about 55% metallic aluminum, about 25% to about 35% titanium dioxide (titania), and about 20% to about 30% boric oxide, all percentages being by weight.

Another mixture of ceramic precursors in particulate form may comprise from about 65% to about 75% silicon and from about 25% to about 35% graphite, the percentages being by weight.

In another embodiment the ceramic precursors may comprise mixtures containing from about 20% to about 30% metallic aluminum, about 20% to about 25% titania, about 15% to about 25% boric oxide, about 25% to about 30% zirconium oxide, all percentages being by weight.

The ceramic precursors may further comprise from about 20% to about 30% metallic aluminum, about 20% to about 25% titania, about 15% to about 25% boric oxide, and about 25% to about 35% powdered niobium, all percentages being by weight.

Still another precursor mixture may comprise from about 20% to about 30% metallic aluminum, about 20% to about 25% titania, about 15% to about 25% boric oxide, about 20% to about 25% aluminum oxide, and about 3% to about 10% zirconium oxide, all percentages being by weight.

As indicated above, additives may be incorporated which will be present in the final porous ceramic product in order to provide combined properties of all the phases present. By way of non-limiting example, when a slurry of iron oxide and aluminum powder is used, titanium and boron may also be incorporated in the slurry, or a second slurry of titanium and boron may be provided into which the initially slurry-impregnated polymer is dipped. If a ceramic filter is produced in this manner, the titanium boride may function as a coated grain refiner which is sometimes used in ceramic filters for aluminum or superalloys. It will be apparent that other additives may be incorporated at any stage of the process either prior to or after the combustion synthesis.

A porous ceramic composite filter of the invention having improved strength and thermal shock resistance comprises an oxide and nonoxide in combination, with the oxide preferably being at least one of alumina, titania and zirconia, and the nonoxide preferably being carbides, borides, nitrides, carbonitrides, metals, metal alloys, or mixtures thereof.

As disclosed in the above cited literature, the particle size of the ceramic precursors is of importance in determining the rate of reaction propagation. For purposes of the present process, particle sizes ranging from about 1 to about 150 microns have been found to be suitable.

It will be understood that the present process is not limited to any particular size or shape of ceramic structure or ceramic composite structure, nor to the pore size thereof, as will be evident from the specific examples which follow.

Moreover, in the process of the invention combustion synthesis may be caused to occur as a part of the step of heating the impregnated polymer to a temperature sufficient to volatilize or decompose the polymer, i.e., heating and ignition may be combined into a single step.

The atmosphere in which combustion synthesis is conducted is also not a limitation. In all embodiments described herein, combustion synthesis may be carried out in air at ambient pressure.

In the following illustrative but non-limiting embodiments of the invention, Examples 1 through 4 relate to the preparation of relatively large pore ceramic or ceramic composite articles, while Examples 5 and 6 relate to the preparation of relatively small pore ceramic composite articles.

EXAMPLE 1

A powder was prepared comprising 37.5% by weight metallic aluminum, 33.3% by weight titania and 29.2% by weight boric oxide. The average particle size of these powders was less than 44 microns. The combustion synthesis reaction for this mixture is:

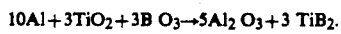

$$10Al + 3TiO_2 + 3B_2O_3 \rightarrow 5Al_2O_3 + 3TiB_2.$$

An aqueous slurry was prepared by mixing 92 grams of the powder mixture described above with 110 grams of colloidal silica solution. A polyurethane foam pad having a pore size of 15 pores per inch (ppi) was dipped into this slurry and was squeezed by hand to remove excess slurry. The coated foam was dried for two hours and then was redipped, squeezed and dried, the dipping, squeezing and drying steps being repeated a total of 3 times. The coated foam was then heated at 900° C., which burned off the polyurethane to form a "green" porous ceramic structure. The green structure was recoated once with the same slurry and ignited with a standard welding electrode to undergo the reaction set forth above, resulting in a final porous ceramic composite article having a pore size and dimension similar to those of the original polyurethane foam pad.

EXAMPLE 2

An initial slurry was prepared in the same manner as that of Example 1, and a polyurethane foam pad having a pore size of 15 ppi was dipped into the slurry, squeezed and dried in the same manner as set forth in Example 1. This coated foam was heated at 900° C., and the green structure was recoated with a second slurry comprising 65% titanium and 35% boron (dry weight). This recoated structure was then ignited by an electric arc to produce a final porous ceramic composite structure, the inner layers of which were composed of aluminum oxide and titanium boride, whereas the outer layers comprised titanium boride and some uncombined titanium.

EXAMPLE 3

The final product of Example 2 was heated in air at 1100° C. for twenty-four hours. The uncombined or free titanium in the outer layers was converted to titanium nitride, and this additional reaction liberated enough heat to cause further sintering of the porous ceramic material.

In a further alternative procedure the final product of Example 2 was packed in carbon powder and reheated at 1100° C. in air for twenty-four hours. The free titanium was converted to titanium carbide, and this additional reaction liberated enough heat to cause further sintering of the porous ceramic material.

EXAMPLE 4

A slurry was prepared comprising 110 parts by weight of a colloidal silica solution and 90 parts by weight of a 50:50 equimolar mixture of silicon and graphite (about 70% silicon and about 30% graphite by weight). A polyurethane foam pad having a pore size of 40 ppi was dipped in this slurry, squeezed to remove excess slurry and dried for two hours. The dipping, squeezing and drying steps were repeated twice. The coated foam was then heated to 800° C. in order to burn off the polyurethane. A combustion reaction was initiated with a welding torch (oxyacetylene flame). The combustion reaction of the ceramic precursors was:

$$Si + C \rightarrow Si\,C.$$

A silicon carbide porous ceramic article was obtained.

EXAMPLE 5

The procedure of Example 1 was followed, except that the polyurethane foam pad was not squeezed after dipping in the slurry, thus resulting in filling all the original pores with the slurry. After drying and heating at 900° C. the green structure was ignited by a welding electrode to undergo the reaction set forth above in Example 1. The resultant final product retained the shape of the original foam but contained interconnected ceramic pores having diameters of about 100 microns.

EXAMPLE 6

A slurry having the composition of Example 1 was prepared and incorporated into a loose bundle of cotton wool fibers of about 25 microns in diameter held in a die. After drying the material was ignited by means of an electric arc to undergo the reaction set forth in Example 1. The resultant porous mass retained the shape of the die and contained fine interconnected pores about 25 microns in diameter.

EXAMPLE 7

A powder mixture was prepared comprising 50% by weight metallic aluminum, 26.67% by weight titania and 23.33% by weight boric oxide. The average particle size of the powders was less than 44 microns. A slurry was prepared with 92 parts by weight of this powder mixture and 110 parts by weight of colloidal silica solution. A polyurethane foam piece having a pore size of 15 ppi was dipped, squeezed and dried in the same manner as in Example 1, burned at 900° C. and ignited with a welding electrode. The combustion reaction resulted in formation of uncombined aluminum metal which flowed and coated the porous inner lining of the material to produce a porous metal-ceramic composite structure having high toughness and strength.

EXAMPLE 8

A series of slurries was prepared incorporating various metallic and non-metallic powders (all less than 44 microns particle size) to obtain porous ceramic composite filters. A polyurethane foam having a pore size of 20 ppi was used in all embodiments, and the processing steps were the same as those set forth in Example 1.

(a) A powder mixture was prepared containing 26.47% metallic aluminum, 23.53% titanium dioxide, 20.59% boric oxide, and 29.41% zirconium oxide, all percentages being by weight. A slurry was prepared by adding 34 parts by weight of this mixture to 90 parts by weight colloidal silica solution.

(b) A powder mixture was prepared containing 26.47% metallic aluminum, 23.53% titanium dioxide, 20.59% boric oxide, and 29.41% powdered niobium, all percentages being by weight. A slurry was prepared by adding 102 parts by weight of this mixture to 99 parts by weight colloidal silica solution.

(c) A powder mixture was prepared containing 26.47% metallic aluminum, 23.53% titanium dioxide, 20.59% boric oxide, 23.53% aluminum oxide, and 5.88% zirconium oxide, all percentages being by weight. A slurry was prepared by adding 102 parts by weight of this mixture to 99 parts by weight colloidal solution.

Each of the above mixtures resulted in composite filters capable of imparting to the material being filtered the benefits of the various phases present in the structure.

EXAMPLE 9

The procedure of Example 4 was repeated, except that prior to initiating combustion the green structure was impregnated with loose carbon powder. This mass was heated only to 400° C. to initiate combustion by heating rapidly inside a 250 KHz induction coil. The final product was a silicon carbide porous ceramic article having a relatively large pore size.

EXAMPLE 10

An aqueous slurry is prepared containing a mixture of about 75% powdered titanium and about 25% powdered boron (dry weight), having average particle sizes of about 50 microns, and polyvinyl alcohol as a binder. A polyurethane foam pad is impregnated with the slurry and processed in the same manner as set forth in Example 1. The final product is a porous titanium boride ceramic structure.

EXAMPLE 11

A slurry is prepared containing a mixture of powdered aluminum and powdered ferric oxide in approximate stoichiometric portions (about 14.5% aluminum and about 85.5% ferric oxide by weight). A foamed polymer shape is impregnated with this slurry, and the procedure set forth above in Example 1 is followed. The final product is a metal-ceramic composite in which metallic iron coats the inner lining of the interconnected aluminum oxide pores, thus providing a structure of high strength and toughness.

We claim:

1. A process for producing a porous ceramic or ceramic composite structure, which comprises providing a slurry of particulate ceramic precursors capable of undergoing combustion synthesis, impregnating a foamed polymer shape with said slurry, heating the slurry-impregnated polymer shape to a temperature sufficient to remove said polymer, and igniting said ceramic precursors to initiate combustion synthesis, thereby obtaining a ceramic or ceramic composite structure having interconnected porosity and controlled pore size.

2. A process for producing a porous metal-ceramic composite structure, which comprises providing a slurry of particulate ceramic and metal precursors capable of undergoing combustion synthesis, impregnating a foamed polymer shape with said slurry, heating the slurry-impregnated polymer shape to a temperature sufficient to remove said polymer, and igniting said ceramic and metal precursors to initiate combustion synthesis, thereby obtaining a metal-ceramic composite structure having interconnected porosity and controlled pore size.

3. The process of claim 1 or 2, wherein said slurry contains at least one of suspension agents, binders, surfactants and anti-foaming agents.

4. The process of claim 1 or 2, wherein the step of impregnating said foamed polymer shape comprises repeated dipping of said polymer shape into said slurry and drying said slurry.

5. The process of claim 1 or 2, including the step of dipping said slurry impregnated polymer shape into said slurry at least once after the step of heating said slurry-impregnated polymer shape to a temperature sufficient to remove said polymer.

6. The process of claim 1 or 2, wherein said slurry-impregnated polymer shape is heated to a temperature of about 400° to about 1100° C. in order to volatilize or decompose said polymer.

7. The process of claim 1 or 2, including the step of applying a second slurry to said slurry-impregnated polymer shape, said second slurry containing particulate ceramic precursors capable of undergoing combustion synthesis and which will provide phases having desired properties.

8. The process of claim 1, wherein said ceramic or ceramic composite is chosen from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium, and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide; and vanadium nitride-aluminum oxide.

9. The process of claim 2, wherein said metal-ceramic composite is chosen from the group consisting of iron-aluminum oxide; aluminum-aluminum oxide-titanium boride; and titanium-titanium boride.

10. The process of claim 1 or 8, wherein said ceramic precursors comprise a mixture of from about 65% to about 95% by weight titanium and about 5% to about 35% by weight boron, said titanium and boron having average particle sizes ranging from about 1 to about 150 microns.

11. The process of claim 10, wherein said porous ceramic structure is a filter for molten metal, and wherein said ceramic precursors include additives for grain refining of said metal.

12. The process of claim 2 or 9, wherein said ceramic precursors comprise a mixture of iron oxide and metallic aluminum in approximately stoichiometric proportions and having average particle sizes ranging from about 1 to about 150 microns.

13. The process of claim 1, 2, 8 or 9, wherein said ceramic precursors comprise a mixture of about 35% to about 55% by weight aluminum, about 25% to about 35% by weight titanium dioxide, and about 20% to about 30% by weight boric oxide.

14. The process of claim 1 or 8, wherein said ceramic precursors comprise a mixture of from about 65% to about 75% by weight silicon and from about 25% to about 35% by weight graphite.

15. The process of claim 1, wherein said ceramic precursors comprise a mixture of from about 20% to about 30% aluminum, about 20% to about 25% titanium dioxide, about 15% to about 25% boric oxide, and about 25% to about 35% zirconium oxide, all percentages being by weight.

16. The process of claim 1 or 2, wherein said ceramic precursors comprise a mixture of from about 20% to about 30% aluminum, about 20% to about 25% titanium dioxide, about 15% to about 25% boric oxide, and about 25% to about 35% powdered niobium, all percentages being by weight.

17. The process of claim 1, wherein said ceramic precursors comprise a mixture of from about 20% to about 30% aluminum, about 20% to about 25% titanium dioxide, about 15% to about 25% boric oxide, about 20% to about 25% aluminum oxide, and about 3% to about 10% zirconium oxide, all percentages being by weight.

18. A porous metal-ceramic composite filter having interconnected porosity and controlled pore size made in accordance with the process of claim 2 or 9.

19. A porous ceramic composite filter having interconnected porosity and controlled pore size made in accordance with the process of claim 1 or 8.

* * * * *